United States Patent
Miller

(10) Patent No.: US 7,960,596 B2
(45) Date of Patent: *Jun. 14, 2011

(54) CONVERSION OF VEGETABLE OILS TO BASE OILS AND TRANSPORTATION FUELS

(75) Inventor: Stephen Joseph Miller, San Francisco, CA (US)

(73) Assignee: Chevron U.S.A. Inc., San Ramon, CA (US)

(*) Notice: Subject to any disclaimer, the term of this patent is extended or adjusted under 35 U.S.C. 154(b) by 289 days.

This patent is subject to a terminal disclaimer.

(21) Appl. No.: 12/179,428

(22) Filed: Jul. 24, 2008

(65) Prior Publication Data

US 2010/0018108 A1   Jan. 28, 2010

(51) Int. Cl.
*C07C 4/00* (2006.01)

(52) U.S. Cl. .................... 585/240; 585/242

(58) Field of Classification Search .................. 585/240, 585/241, 242
See application file for complete search history.

(56) References Cited

U.S. PATENT DOCUMENTS

| | | | |
|---|---|---|---|
| 4,218,386 A | 8/1980 | Logan et al. | |
| RE32,241 E | 9/1986 | Saxer | |
| 4,792,418 A | 12/1988 | Rubin et al. | |
| 4,859,312 A | 8/1989 | Miller | |
| 4,992,605 A * | 2/1991 | Craig et al. | 585/240 |
| 5,158,665 A | 10/1992 | Miller | |
| 5,300,210 A | 4/1994 | Zones et al. | |
| 6,166,231 A | 12/2000 | Hoeksema | |
| 6,204,426 B1 | 3/2001 | Miller et al. | |
| 6,630,066 B2 | 10/2003 | Cash et al. | |
| 6,723,889 B2 | 4/2004 | Miller et al. | |
| 6,841,063 B2 | 1/2005 | Elomari | |
| 7,402,236 B2 * | 7/2008 | Miller et al. | 208/27 |
| 7,491,858 B2 * | 2/2009 | Murzin et al. | 585/240 |
| 7,550,634 B2 * | 6/2009 | Yao et al. | 585/240 |
| 7,691,159 B2 * | 4/2010 | Li | 44/605 |
| 7,718,051 B2 * | 5/2010 | Ginosar et al. | 208/113 |
| 7,754,931 B2 * | 7/2010 | Monnier et al. | 585/240 |
| 2004/0230085 A1 * | 11/2004 | Jakkula et al. | 585/240 |
| 2006/0264684 A1 * | 11/2006 | Petri et al. | 585/250 |
| 2007/0006523 A1 | 1/2007 | Myllyoja et al. | |
| 2007/0010682 A1 | 1/2007 | Myllyoja et al. | |
| 2007/0260102 A1 * | 11/2007 | Duarte Santiago et al. | 585/733 |

FOREIGN PATENT DOCUMENTS

| EP | 1741767 | * 10/2007 |
|---|---|---|
| FI | 100248 B | * 10/1997 |
| WO | WO 2006/100584 | * 9/2006 |
| WO | WO2007063874 | 6/2007 |

OTHER PUBLICATIONS

Certified english Translation FI 100248B by USPTO Aug. 2006 Translated by Mcelroy Translation Co.*
PCT International Search Report dated Jan. 29, 2010 (3 pages).

(Continued)

Primary Examiner — N. Bhat
(74) Attorney, Agent, or Firm — Edward T. Mickelson

(57) ABSTRACT

The present invention is directed to methods (processes) and systems for processing triglyceride-containing, biologically-derived oils to provide for base oils and transportation fuels, wherein partial oligomerization of fatty acids contained therein provide for an oligomerized mixture from which the base oils and transportation fuels can be extracted. Such methods and systems can involve an initial hydrotreating step or a direct isomerization of the oligomerized mixture.

22 Claims, 4 Drawing Sheets

OTHER PUBLICATIONS

Huber et al., "Synthesis of Transportation Fuels from Biomass: Chemistry, Catalysts, and Engineering," Chem. Rev., vol. 106, pp. 4044-4098 (2006).

Rana et al., "A Review of Recent Advances on Process Technologies for Upgrading of Heavy Oils and Residua," Fuel, vol. 86, pp. 1216-1231 (2007).

Meher et al., "Technical Aspects of Biodiesel Production by Transesterification—A Review," Renew. & Sustain. Energy Rev., vol. 10, pp. 248-268, 2006.

F. Pearce, "Fuels Gold," New Scientist, Sep. 23, 2006, pp. 36-41.

* cited by examiner

CONVERSION OF VEGETABLE OILS TO BASE OILS AND TRANSPORTATION FUELS

FIELD OF THE INVENTION

This invention relates generally to fuels and lubricants derived from biomass, and specifically to methods and systems for efficiently making base oils and transportation fuels from vegetable or crop oils.

BACKGROUND

Biofuels are of increasing interest for a number of reasons including: (1) they are a renewable resource, (2) their production is less dependent on geopolitical considerations, (3) they provide the possibility of a direct replacement of petroleum-based fuels in existing vehicles, and (4) the net greenhouse gas emissions can be substantially reduced by virtue of $CO_2$ uptake by biofuel precursors—particularly in the case of cellulosic feedstocks. See Pearce, "Fuels Gold," New Scientist, 23 Sep., pp. 36-41, 2006.

An easily-obtainable biofuel is vegetable oil, which largely comprises triglycerides and some free fatty acids. The properties of vegetable oil, however, make it generally inappropriate for use as a direct replacement for petroleum diesel in vehicle engines, as the vegetable oils' viscosities are generally too high and do not burn cleanly enough, thereby leaving damaging carbon deposits on the engine. Additionally, vegetable oils tend to gel at lower temperatures, thereby hindering their use in colder climates. These problems are mitigated when the vegetable oils are blended with petroleum fuels, but still remain an impediment for long-term use in diesel engines. See Pearce, 2006; Huber et al., "Synthesis of Transportation Fuels from Biomass: Chemistry, Catalysts, and Engineering," Chem. Rev., vol. 106, pp. 4044-4098, 2006.

Transesterification is currently a method used to convert vegetable oils into diesel-compatible fuels (i.e., conventional biodiesel) that can be burned in conventional diesel engines. See, e.g., Meher et al., "Technical Aspects of Biodiesel Production by Transesterification—A Review," Renew. & Sustain. Energy Rev., vol. 10, pp. 248-268, 2006. However, a similar cold flow problem with conventional biodiesel fuels still remains. This problem is at least partly due to the fact that at lower temperatures, e.g., around freezing (ca. 0° C.), biodiesel often thickens and does not flow as readily. Conventional biodiesel is primarily composed of methyl esters which have long straight chain aliphatic groups attached to a carbonyl group. Also, the transesterification of vegetable oils exhibits a problem of producing more than 90% diesel range fuels with little or no kerosene or gasoline range fractions, thereby limiting the types of fuels produced therefrom. For the conversion of vegetable and other oils to some fuels (e.g., non-diesel), it is likely that the oils must first be converted to alkanes (paraffins).

It is also worth noting that unsaturation in the fatty acids (obtained from the vegetable oil) contributes to poor oxidation stability and deposits, and that while hydrogenation will generally improve the oxidation stability of the fuel, it can make the already poor low temperature performance of the fuel even worse. Isomerization of the paraffins can ameliorate this problem.

Accordingly, methods and systems for efficiently processing vegetable and/or crop oils into a broader range of fuel types and lubricants, often simultaneously, would be highly beneficial.

BRIEF DESCRIPTION OF THE INVENTION

In some embodiments, the present invention is directed to methods (i.e., processes) and systems for processing triglyceride-containing, biologically-derived oils, so as to produce base oils and transportation fuels, wherein such processing can initially proceed via hydrotreating (Type 1) or direct isomerization (Type 2). In all such cases, the processing effects at least a partial oligomerization of fatty acid components of the biologically-derived oils. In some such embodiments, such oligomerization serves to increase the carbon number of at least some of the product, so as to afford a broader range of base oils and lubricant compositions. The multiple product streams afforded by some such systems/methods (e.g., diesel fuel+high-value lubricants) serve to enhance the economics of these systems/methods over that of the respective systems/methods that provide for single product streams.

In some embodiments, the present invention is directed to one or more methods of a first type (Type 1 Methods) for producing base oil and diesel or other transportation fuel, the methods comprising the steps of: (a) processing a triglyceride-containing vegetable oil to effect oligomerization (e.g., dimerization) and deoxygenation (e.g., elimination of carboxyl, carbonyl, and/or hydroxyl moieties) of unsaturated fatty acid components contained therein so as to provide for an oligomerized mixture, wherein said processing comprises hydrotreating and subsequent water removal; (b) isomerizing the oligomerized mixture over an isomerization catalyst to yield an isomerized mixture, wherein the isomerized mixture comprises a base oil component and a diesel fuel component, and wherein the isomerized mixture comprises at least 10 wt. % alkanes (paraffins) having a carbon number of 30 or greater; and (c) distilling the isomerized mixture to yield/produce a base oil and a diesel fuel.

In some embodiments, the present invention is directed to one or more systems of a first type (Type 1 Systems) for producing base oil and diesel fuel processing triglyceride-containing, biologically-derived (e.g., vegetable- or crop-based) oil, such systems comprising the following elements: (a) a processing subsystem for processing a triglyceride-containing vegetable oil so as to effect oligomerization and deoxygenation of unsaturated fatty acid components contained therein, thereby providing for an oligomerized mixture, wherein said processing comprises hydrotreating and subsequent water removal; (b) an isomerization unit for isomerizing the oligomerized mixture over an isomerization catalyst to yield an isomerized mixture, wherein the isomerized mixture comprises a base oil component and a diesel fuel component, and wherein the isomerized mixture comprises at least 10 wt. % alkanes having a carbon number of 30 or greater; and (c) a distillation unit for distilling the isomerized mixture so as to yield a base oil and a diesel fuel.

In some embodiments, the present invention is directed to one or more methods of a second type (Type 2 Methods) for producing base oil and diesel fuel, such methods comprising the steps of (a) processing a triglyceride-containing vegetable oil to effect oligomerization of unsaturated fatty acid components contained therein so as to provide for an oligomerized mixture; (b) isomerizing the oligomerized mixture over an isomerization catalyst to yield an isomerized mixture, wherein the isomerized mixture comprises a base oil component and a diesel fuel component; (c) stripping the isomerized mixture of water to yield a dry isomerized mixture, wherein the dry isomerized mixture comprises at least 10 wt. % alkanes having a carbon number of 30 or greater; (d) separating the dry isomerized mixture into a lower boiling fraction from which diesel fuel is subsequently derived, and a higher boiling fraction; and (e) subsequently further isomerizing at least a portion of the higher boiling fraction to yield a base oil.

In some embodiments, the present invention is directed to one or more systems of a second type (Type 2 Systems) for processing triglyceride-containing, biologically-derived oil, such systems comprising the following elements: (a) a processing subsystem for processing a triglyceride-containing vegetable oil so as to effect oligomerization of unsaturated fatty acid components contained therein, and thereby provide for an oligomerized mixture; (b) a first isomerization unit for isomerizing the oligomerized mixture so as to yield an isomerized mixture, wherein the isomerized mixture comprises a base oil component and a diesel fuel component; (c) a stripper for stripping the isomerized mixture of water so as to yield a dry isomerized mixture, wherein the dry isomerized mixture comprises at least 10 wt. % alkanes having a carbon number of 30 or greater; (d) a separation unit for separating the dry isomerized mixture into a low boiling fraction from which diesel fuel is subsequently derived, and a high boiling fraction; and (e) a second isomerization unit for subsequently further isomerizing the high boiling fraction to yield a base oil.

The foregoing has outlined rather broadly features of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

1. Introduction

Figure 1:
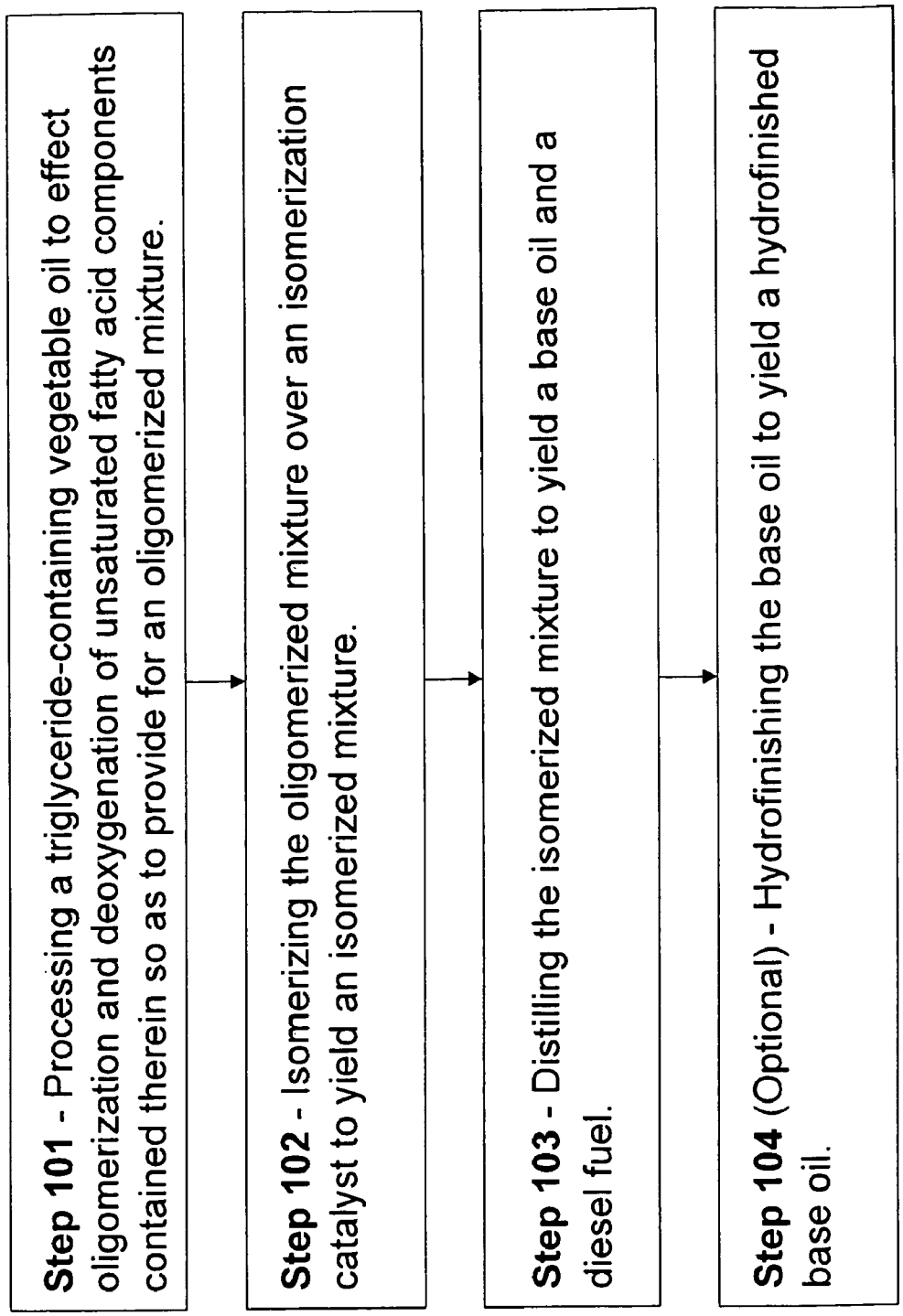
FIG. 1 depicts, in stepwise fashion, Type 1 methods for processing triglyceride-containing oil of biological origin so as to yield base oil and product fuel, in accordance with some embodiments of the present invention.

Embodiments of the present invention are directed to methods (processes) and systems for processing triglyceride-containing, biologically-derived oils so as to effect oligomerization and deoxygenation of unsaturated fatty acid (carboxylic acid) components contained therein, en route to the production of base oils and transportation fuels (e.g., diesel fuel). Processing in such methods and systems effects at least a partial oligomerization (e.g., dimerization) of the fatty acid components. In some such methods and systems (Type 1), the processing proceeds via an initial hydrotreating, whereas in other such methods and systems (Type 2), the processing proceeds directly via an isomerizing step.

In view of the above-described limitations of the prior art, advantages of the methods and systems of the present invention include, but are not limited to, the generation of multiple product streams, and the ability to integrate one or more of these streams with traditional refinery streams and processes.

2. Definitions

Certain terms and phrases are defined throughout this description as they are first used, while certain other terms used in this description are defined below:

The prefix "bio," as used herein, refers to an association with a renewable resource of biological origin, such resources generally being exclusive of fossil fuels.

A "biologically-derived oil," as defined herein, refers to any triglyceride-containing oil that is at least partially derived from a biological source such as, but not limited to, crops, vegetables, microalgae, and the like. Such oils may further comprise free fatty acids. The biological source is henceforth referred to as "biomass." For more on the advantages of using microalgae as a source of triglycerides, see R. Baum, "Microalgae are Possible Source of Biodiesel Fuel," Chem. & Eng. News, vol. 72(14), pp. 28-29, 1994.

"Triglyceride," as defined herein, refer to class of molecules having the following molecular structure:

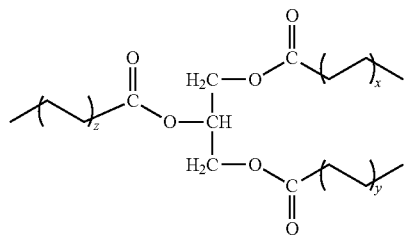

where x, y, and z can be the same or different, and wherein one or more of the branches defined by x, y, and z can have unsaturated regions.

A "carboxylic acid" or "fatty acid," as defined herein, is a class of organic acids having the general formula:

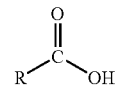

where "R" is generally a saturated (alkyl) hydrocarbon chain or a mono- or polyunsaturated (alkenyl) hydrocarbon chain, wherein such unsaturation is provided by one or more carbon-carbon double bonds (C=C) in said chain.

"Lipids," as defined herein, broadly refers to the class of molecules comprising fatty acids, and tri-, di-, and monoglycerides.

"Hydrolysis" of triglycerides yields free fatty acids and glycerol, such fatty acid species also commonly referred to as carboxylic acids (see above).

"Transesterification," or simply "esterification," refers to the reaction between a fatty acid and an alcohol to yield an ester species.

"Oligomerization," as defined herein, refers to additive reaction of like or similar molecules (i.e., "mers") to form a larger molecule. For example, unsaturated fatty acids of the present invention can react or combine via the double bonds in their structures. When two such species combine to form a larger molecule, the resulting species is termed a "dimer." When, for example, the aforementioned fatty acid components contain multiple regions of unsaturation, oligomers comprised of three or more mers are possible (e.g., "trimers").

"Hydroprocessing" or "hydrotreating" refers to processes or treatments that react a hydrocarbon-based material with hydrogen, typically under pressure and with a catalyst (hydroprocessing can be non-catalytic). Such processes include, but are not limited to, hydrodeoxygenation (of oxygenated species), hydrotreating, hydrocracking, hydroisomerization, and hydrodewaxing. For examples of such processes, see Cash et al., U.S. Pat. No. 6,630,066; and Elomari, U.S. Pat. No. 6,841,063. Embodiments of the present invention utilize such hydroprocessing to convert triglycerides to paraffins. The terms "hydroprocessing" and "hydrotreating" are used interchangeably herein.

"Hydrofinishing," as defined herein, refers to the treatment of a hydrocarbon-based material with hydrogen under conditions typically less severe than those of hydrotreating, so as to remove impurities and/or improve one or more physical properties (e.g., color, viscosity, oxidation stability, etc.), thereby rendering an improved product.

"Isomerizing," as defined herein, refers to catalytic processes that typically convert n-alkanes to branched isomers. ISODEWAXING (Trademark of CHEVRON U.S.A. INC.) catalysts are representative catalysts used in such processes. See, e.g., Zones et al., U.S. Pat. No. 5,300,210; Miller, U.S. Pat. No. 5,158,665; and Miller, U.S. Pat. No. 4,859,312.

"Transportation fuels," as defined herein, refer to hydrocarbon-based fuels suitable for consumption by vehicles. Such fuels include, but are not limited to, diesel, gasoline, jet fuel and the like.

"Diesel fuel," as defined herein, is a material suitable for use in diesel engines and conforming to the current version at least one of the following specifications: ASTM D 975—"Standard Specification for Diesel Fuel Oils"; European Grade CEN 90; Japanese Fuel Standards JIS K 2204; The United States National Conference on Weights and Measures (NCWM) 1997 guidelines for premium diesel fuel; and The United States Engine Manufacturers Association recommended guideline for premium diesel fuel (FQP-1A).

"Lubricants," as defined herein, are substances (usually a fluid under operating conditions) introduced between two moving surfaces so to reduce the friction and wear between them. "Base oils" used as/in motor oils are generally classified by the American Petroleum Institute as being mineral oils (Group I, II, and III) or synthetic oils (Group IV and V). See American Petroleum Institute (API) Publication Number 1509. Typically, for lubricants, one or more additives are added to base oil to improve one or more of its properties and make it more suitable for a desired lubricant application.

"Viscosity," can generally be viewed herein, as it is colloquially, as a fluid's resistance to flow. In many situations, viscosity is more conveniently expressed in terms of "kinematic viscosity" having units of centistokes (cSt).

"Viscosity index" or "VI," as defined herein, refers to an index created by the Society of Automotive Engineers (SAE) to index changes in a lubricant's viscosity with variations in temperature, wherein the viscosity of a lubricant with a higher VI will be less dependent on temperature than the viscosity of a lubricant with a lower VI. Historically, since the index's temperature boundaries are 100° F. (40° C.) and 210° F. (100° C.), the original scale spanned only from VI=0 (worst oil) to VI=100 (best oil). However, since the conception of the scale, better oils (e.g., synthetic oils) have been produced, leading to VIs greater than 100.

"Pour point," as defined herein, represents the lowest temperature at which a fluid will pour or flow. See, e.g., ASTM International Standard Test Methods D 5950-96, D 6892-03, and D 97.

"Cloud point," as defined herein, represents the temperature at which a fluid begins to phase separate due to crystal formation. See, e.g., ASTM Standard Test Methods D 5773-95, D 2500, D 5551, and D 5771.

As defined herein, "$C_n$," where "n" is an integer, describes a hydrocarbon or hydrocarbon-containing molecule or fragment (e.g., an alkyl or alkenyl group) wherein "n" denotes the number of carbon atoms in the fragment or molecule—irrespective of linearity or branching.

3. Methods of the First Type

As mentioned previously, and with reference to FIG. 1, in some embodiments the present invention is directed to one or more methods for producing base oil and diesel fuel, the methods comprising the steps of: (Step 101) processing a triglyceride-containing vegetable oil to effect oligomerization and deoxygenation of unsaturated fatty acid components contained therein so as to provide for an oligomerized mixture, wherein said processing comprises hydrotreating and subsequent water removal; (Step 102) isomerizing the oligomerized mixture over an isomerization catalyst to yield an isomerized mixture, wherein the isomerized mixture comprises a base oil component and a diesel fuel component, and wherein the isomerized mixture comprises at least 10 wt. % alkanes having a carbon number of 30 or greater; and (Step 103) distilling the isomerized mixture to yield a base oil and a diesel fuel. In some such method embodiments, there further (optionally) comprises a step (Step 104) of hydrofinishing the base oil to yield a hydrofinished base oil.

In some embodiments, such above-described methods further comprise an initial step of subjecting biomass to an extraction process, wherein said extraction process provides for a quantity of triglyceride-containing vegetable oil. Typically, such an extraction process involves solvent extraction. Such processes are well-known to those of skill in the art. See, e.g., Hoeksema, U.S. Pat. No. 6,166,231.

In some such above-described method embodiments, the step of processing further comprises an initial substep of hydrolyzing the triglycerides contained within the vegetable oil so as to yield free fatty acids. Such hydrolysis can be acid- or base-catalyzed. Hydrolysis of triglycerides to yield free fatty acids and glycerol is well-established and known to those of skill in the art. See, e.g., Logan et al., U.S. Pat. No. 4,218,386.

While not intending to be bound by theory, the above-described oligomerization is thought to occur via additive coupling reactions between fatty acid components having regions of unsaturation. Note that, depending on the embodiment, oligomerization can occur before hydrotreating, during hydrotreating, and before and during hydrotreating. Typically, such oligomerization would be thermally-driven, but it is envisioned that this could additionally or alternatively be chemically- or catalytically-induced.

In some such above-described method embodiments, the oligomerized mixture comprises an oligomer component, wherein the oligomer component of said mixture comprises at least about 50 wt. % dimer (dimeric) species (i.e., dimers resulting from the dimerization of unsaturated fatty acid components). In some other embodiments, the oligomer component comprises at least 50 wt. % dimer species.

In some such above-described embodiments, there is a sub-step of increasing the unsaturated fatty acid component concentration prior to oligomerization. This can be done, for example, using fractional crystallization methods. See, e.g., Rubin et al., U.S. Pat. No. 4,792,418; and Saxer, U.S. Pat. No. RE 32,241. Such a concentration enhancement of the unsaturated species can yield oligomerized mixtures with higher oligomer content.

In some such above-described method embodiments, the vegetable or other biologically-derived oil originates from a biomass source selected from the group consisting of crops, vegetables, microalgae, and combinations thereof. Those of skill in the art will recognize that generally any biological source of lipids can serve as the biomass from which the biologically-derived oil comprising triglycerides can be obtained. It will be further appreciated that some such sources are more economical and more amenable to regional cultivation, and also that those sources from which food is riot derived may be additionally attractive (so as not to be seen as competing with food). Exemplary biologically-derived oils/oil sources include, but are not limited to, canola, soy, rapeseed, palm, peanut, jatropha, yellow grease, algae, and the like.

In some such above-described method embodiments, the sub-process of hydrotreating involves a hydroprocessing/hydrotreating catalyst and a hydrogen-containing environment. In some embodiments, the active hydrotreating catalyst component is a metal or alloy selected from the group consisting of cobalt-molybdenum (Co—Mo) catalyst, nickel-molybdenum (Ni—Mo) catalyst, noble metal catalyst, and combinations thereof. Such species are typically supported on a refractory oxide support (e.g., alumina or $SiO_2$—$Al_2O_3$). Hydrotreating conditions generally include temperature in the range of about 550° F. to about 800° F.; and $H_2$ partial pressure generally in the range of about 400 pounds-force per square inch gauge (psig) to about 2000 psig, and typically in the range of about 500 psig to about 1500 psig. For a general review of hydroprocessing/hydrotreating, see, e.g., Rana et al., "A Review of Recent Advances on Process Technologies for Upgrading of Heavy Oils and Residua," Fuel, vol. 86, pp. 1216-1231, 2007. For an example of how triglycerides can be hydroprocessed to yield a paraffinic product, see Craig et al., U.S. Pat. No. 4,992,605.

In some such above-described method embodiments, the subsequent water stripper. Other devices and methods for water removal can also/alternatively be employed. Such devices/methods are known to those of skill in the art.

Generally, the step of isomerizing is carried out using an isomerization catalyst. Suitable such isomerization catalysts can include, but are not limited to Pt or Pd on a support such as, but further not limited to, SAPO-11, SM-3, SSZ-32, ZSM-23, ZSM-22; and similar such supports. In some or other embodiments, the step of isomerizing involves a Pt or Pd catalyst supported on an acidic support material selected from the group consisting of beta or zeolite Y molecular sieves, $SiO_2$, $Al_2O_3$, $SiO2$—$Al_2O_3$, and combinations thereof. In some such embodiments, the isomerization is carried out at a temperature between about 500° F. and about 750° F., and typically between 550° F. and about 750° F. The operating pressure is typically 200 psig to 2000 psig, and more typically 200 psig to 1000 psig. Hydrogen flow rate is typically 50 to 5000 standard cubic feet/barrel (SCF/barrel). For other suitable isomerization catalysts, see, e.g., Zones et al., U.S. Pat. No. 5,300,210; Miller, U.S. Pat. No. 5,158,665; and Miller, U.S. Pat. No. 4,859,312.

With regard to the catalytically-driven isomerizing step described above, in some embodiments, the methods described herein may be conducted by contacting the n-paraffinic product with a fixed stationary bed of catalyst, with a fixed fluidized bed, or with a transport bed. In one presently contemplated embodiment, a trickle-bed operation is employed, wherein such feed is allowed to trickle through a stationary fixed bed, typically in the presence of hydrogen. For an illustration of the operation of such catalysts, see Miller et al., U.S. Pat. Nos. 6,204,426 and 6,723,889.

In some such above-described embodiments, the isomerized mixture can comprise at least 20 wt. % alkanes having a carbon number of 30 or greater, and in others it can comprise at least 30 wt. % alkanes having a carbon number of 30 or greater. While not intending to be bound by theory, it is believed that oligomerization (and subsequent deoxygenation) of fatty acid components of the vegetable oil are primarily responsible for such high levels of alkanes of $C_{n \geq 30}$.

In some embodiments, the step of distilling employs a distillation column (unit) to separate the base oil and diesel fuel into individual fractions. Generally, the base oil is collected in a high-boiling fraction and the diesel fuel is collected in a low-boiling fraction. In some particular embodiments, a fractional bifurcation occurs at or around 650° F., in which case the diesel fuel is largely contained within a 650° F.−fraction (boiling below 650° F.) and the base oil is contained within a 650° F.+ fraction (boiling above 650° F.). Those of skill in the art will recognize that there is some flexibility in characterizing the high and low boiling fractions, and that the products (base oil and diesel fuel) may be obtained from "cuts" at various temperature ranges.

In some embodiments, the diesel fuel produced comprises at least 70 wt. % $C_{12}$ to $C_{18}$ alkanes. In some or other such embodiments, the diesel fuel has a pour point of less than −10° C. In some embodiments, the base oil produced has a pour point of less than −10° C. In some or still other such embodiments, the base oil has a viscosity index of generally greater than 120, and typically greater than 130.

With regard to the optional hydrofinishing step 104, this generally serves to improve color, and oxidation and thermal stability.

In some such above-described method embodiments, the base oils produced in Step 103 and/or Step 104 are suitable for use as, and/or inclusion in, synthetic biolubricants, and/or other such formulations that impart lubricity. In some embodiments, such above-described methods further comprise a step of blending the base oils with one or more ester species. In some or still other embodiments, such above-described methods further comprise a step of blending the produced base oils with a conventionally-derived base oil selected from the group consisting of Group I oils, Group II oils, Group III oils, and combinations thereof.

4. Systems of the First Type

Figure 2:
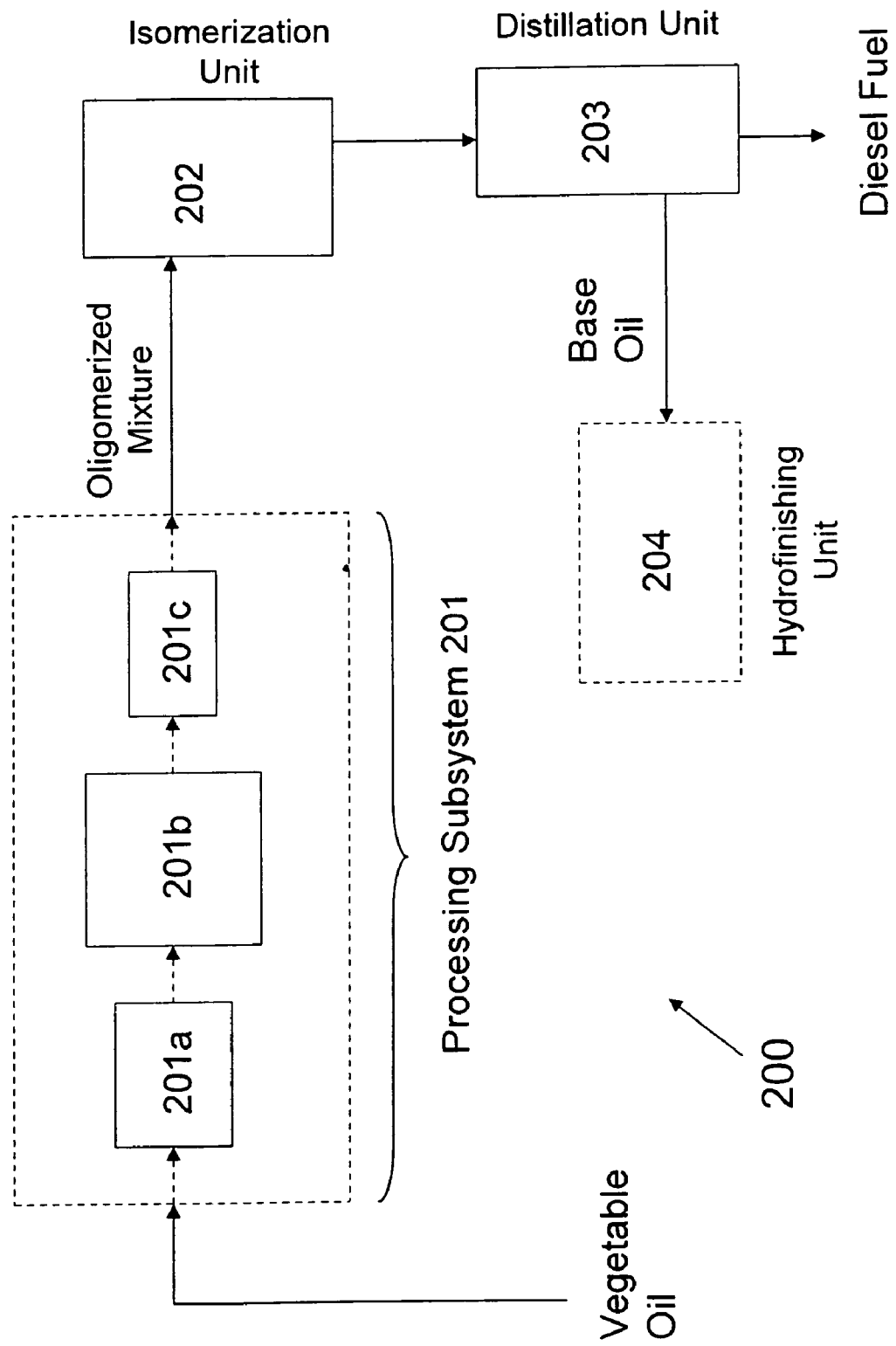
FIG. 2 illustrates an exemplary Type 1 system for implementing methods of the type depicted in FIG. 1.

As already mentioned in a previous section, and with reference to FIG. 2, in some embodiments the present invention is directed to one or more systems (e.g., system 200) for processing triglyceride-containing, biologically-derived oil, such systems (200) comprising the following elements: a processing subsystem (201) for processing a triglyceride-containing vegetable oil so as to effect oligomerization and deoxygenation of unsaturated fatty acid components contained therein, thereby providing for an oligomerized mixture, wherein said processing comprises hydrotreating (via hydrotreating subunit 201b) and subsequent water removal (via stripper 201c); an isomerization unit (202) for isomerizing the oligomerized mixture over an isomerization catalyst to yield an isomerized mixture, wherein the isomerized mixture comprises a base oil component and a diesel fuel component, and wherein the isomerized mixture comprises at least 10 wt. % alkanes having a carbon number of 30 or greater, typically 20 wt. % such alkanes, and more typically 30 wt. % such alkanes; and a distillation unit (203) for distilling the isomerized mixture so as to yield a base oil and a diesel fuel. In some such embodiments, such systems further comprise a hydrofinishing unit (204) for hydrofinishing the base oil.

In some such above-described embodiments, the processing subsystem further comprises a hydrolysis reactor (201a) for initially hydrolyzing the triglycerides contained within the vegetable oil so as to yield free fatty acids.

Generally, all of the above-described systems and corresponding units are configured for processing a triglyceride-containing, biologically-derived oil in accordance with one or more of the methods described in Section 3. Further, there is typically a proximal relationship between the various units that comprise system 200, but this need not be the case. Such relationships may be influenced by existing infrastructure and/or other economic considerations.

5. Methods of the Second Type

Figure 3:
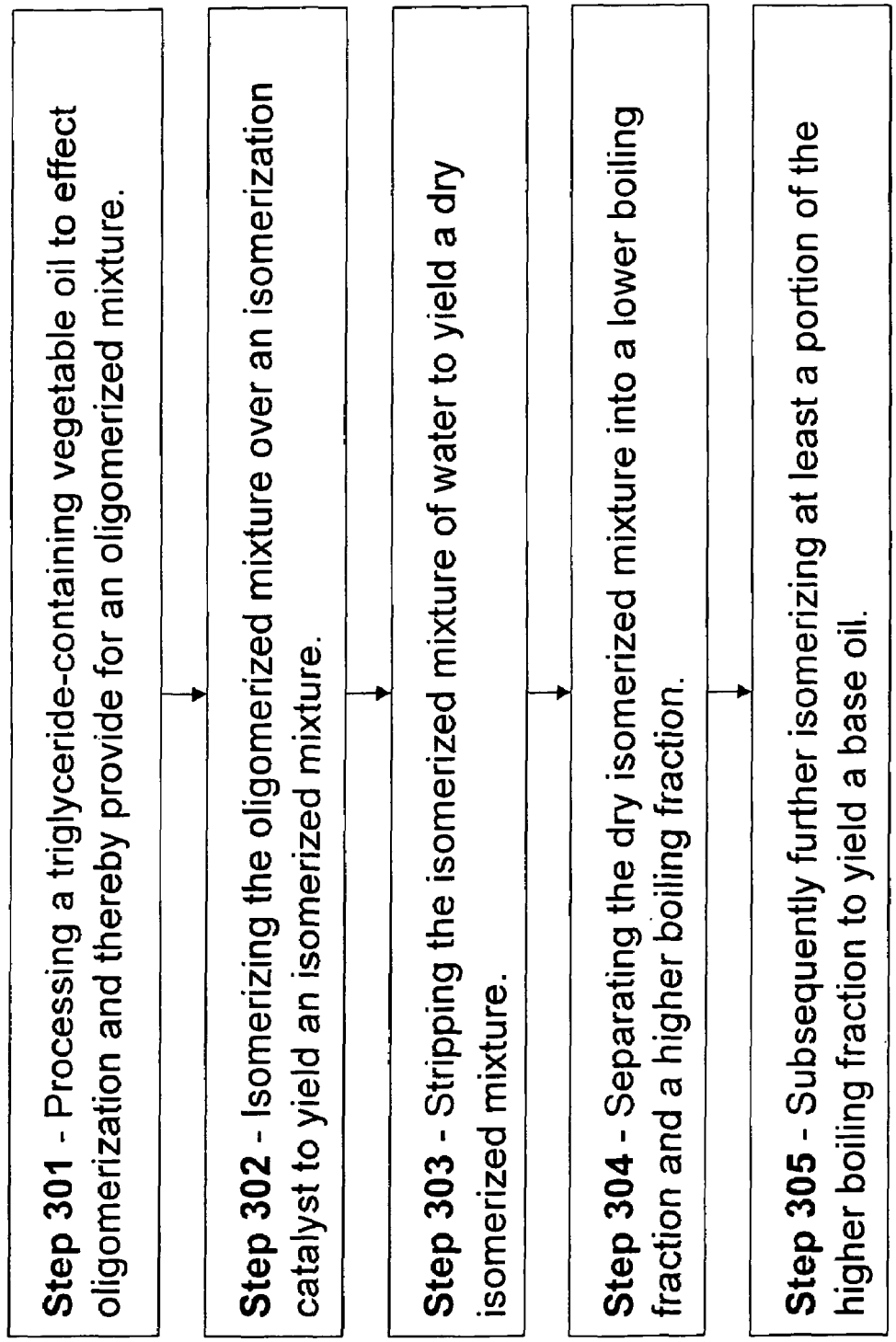
FIG. 3 depicts, in stepwise fashion, Type 2 methods for processing triglyceride-containing oil of biological origin so as to yield base oil and product fuel, in accordance with some alternative embodiments of the present invention.

Referring now to FIG. 3, in some embodiments, the present invention is directed to one or more methods for producing base oil and diesel fuel, such methods comprising the steps of: (Step 301) processing a triglyceride-containing vegetable oil to effect oligomerization of unsaturated fatty acid components contained therein so as to provide for an oligomerized mixture; (Step 302) isomerizing the oligomerized mixture over an isomerization catalyst to yield an isomerized mixture, wherein the isomerized mixture comprises a base oil component and a diesel fuel component; (Step 303) stripping the isomerized mixture of water to yield a dry isomerized mixture, wherein the dry isomerized mixture comprises at least 10 wt. % alkanes having a carbon number of 30 or greater; (Step 304) separating the dry isomerized mixture into a lower boiling fraction from which diesel fuel is subsequently derived, and a higher boiling fraction; and (Step 305) subsequently isomerizing at least a portion of the higher boiling fraction to yield a base oil. Similar to the methods described in Section 3, in some such embodiments, such methods further comprise a step of hydrofinishing the base oil to yield a hydrofinished base oil.

In some such above-described method embodiments, the vegetable oil comprises one or more biologically-derived oils selected from the group consisting of canola, soy, rapeseed, palm, peanut, jatropha, yellow grease, algae, and combinations thereof.

In some such above-described method embodiments, the oligomerized mixture comprises an oligomer component, said oligomer component comprising at least about 50 wt. % dimer species, and more typically at least about 70 wt. % dimer species.

In some such above-described method embodiments, the step of isomerizing is carried out at a temperature of between 550° F. and 750° F., using any one of a variety of isomerization catalysts.

In some such above-described method embodiments, the isomerized mixture can comprise at least about 20 wt. % alkanes having a carbon number of 30 or greater, and in some cases it can comprise at least about 30 wt. % alkanes having a carbon number of 30 or greater.

In some such above-described method embodiments, the diesel fuel comprises at least 70 wt. % $C_{12}$ to $C_{18}$ alkanes. In these or other embodiments, the diesel fuel has a pour point of less than −10° C.

In some such above-described method embodiments, the base oil has a pour point of less than −10° C. In these or other embodiments, the base oil has a viscosity index of greater than 120.

In some such above-described method embodiments, the hydrofinished base oil has a pour point of less than −10° C. In these or other embodiments, the hydrofinished base oil has a viscosity index of greater than 120.

Generally, to the extent that they share common steps, aspects of the Type 2 methods are consistent with those of the Type 1 methods described in Section 3. For example, processing Step 301 may further comprise a sub-step of hydrolyzing the triglycerides such as described for some of the Type 1 methods above. Similarly, concentration of oligomeric species in the oligomerized mixture can be effected via fractional crystallization methods, as described above.

6. Systems of the Second Type

Figure 4:
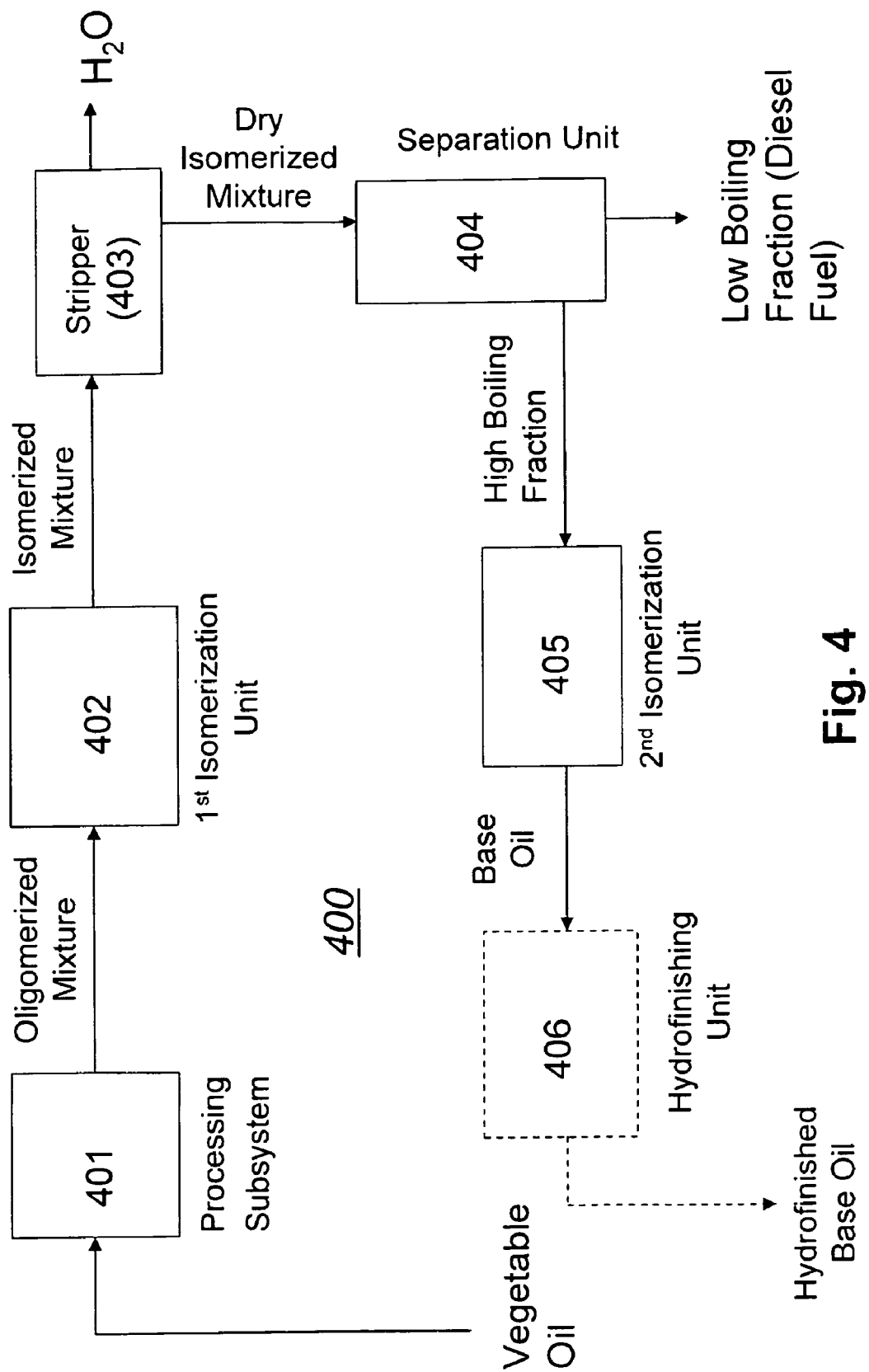
FIG. 4 illustrates an exemplary Type 2 system for implementing methods of the type depicted in FIG. 3.

Referring now to FIG. 4, in some embodiments, the present invention is directed to one or more systems (e.g., system 400) for processing triglyceride-containing, biologically-derived oil, such systems comprising the following elements: (a) a processing subsystem (401) for processing a triglyceride-containing vegetable oil so as to effect oligomerization of unsaturated fatty acid components contained therein, and thereby provide for an oligomerized mixture; (b) a first isomerization unit (402) for isomerizing the oligomerized mixture so as to yield an isomerized mixture, wherein the isomerized mixture comprises a base oil component and a diesel fuel component; (c) a stripper (403) for stripping the isomerized mixture of water so as to yield a dry isomerized mixture, wherein the dry isomerized mixture comprises at least 10 wt. % alkanes having a carbon number of 30 or greater; (d) a separation unit (404) for separating the dry isomerized mixture into a low boiling fraction from which diesel fuel is subsequently derived, and a high boiling fraction; and (e) a second isomerization unit (405) for subsequently isomerizing the high boiling fraction to yield a base oil. In some such embodiments, such systems further comprise a hydrofinishing unit (406) for hydrofinishing the base oil to yield a hydrofinished base oil.

Generally, all of the above-described systems and corresponding units are configured for processing a triglyceride-containing, biologically-derived oil in accordance with one or more of the methods described in Section 5. Furthermore, as in the case of Type 1 systems, there is typically a proximal relationship between the various units that comprise system 400, but this need not be the case. Such relationships may be influenced by existing infrastructure and/or other economic considerations.

7. Variations

In some Type 2 methods, hydroprocessing may be a sub-process of the initial processing step. Some such variation embodiments may begin to converge on the methods of Type 1. Similar observations may be made regarding the corresponding systems.

In some embodiments of Type 1 and Type 2 methods, the initial processing step and the isomerizing step are fully or partially integrated such that these processes are carried out simultaneously.

In some presently-contemplated embodiments, the methods and/or systems of the present invention can be fully or partially integrated with conventional refinery processes— particularly in situations wherein such integration provides for a synergistic enhancement of the production economics.

In some or other such variant embodiments, non-crop sources of triglyceride-containing oil can be mixed or admixed with the biologically-derived oil used herein.

The transportation fuels produced by the methods/systems of the present invention can extend beyond diesel fuel. Those of skill in the art will recognize that the composition of the resulting transportation fuel will be a function of the chain length of the carboxylic acid components of the triglyceride-bearing, biologically-derived oil.

8. Example

The following example is provided to demonstrate particular embodiments of the present invention. It should be appreciated by those of skill in the art that the methods disclosed in the example which follows merely represent exemplary embodiments of the present invention. However, those of skill in the art should, in light of the present disclosure, appreciate that many changes can be made in the specific embodiments described and still obtain a like or similar result without departing from the spirit and scope of the present invention.

This Example serves to illustrate a method of processing a vegetable oil en route to forming a transportation fuel and a base oil, in accordance with some embodiments of the present invention.

Canola oil was hydrotreated over a Ni—Mo/Al$_2$O$_3$ hydrotreating catalyst under the following conditions: 1000 psig, 5000 scf/bbl H$_2$, 1.66 LHSV (liquid hourly space velocity), and 610° F. This reactor was followed by a second reactor containing a Pt on SM-3 sieve isomerization catalyst, also at 1.66 LHSV and a temperature of 700° F. Processing conditions effected a "conversion yield" as follows: 92 weight percent of the canola oil was converted from 650° F.+ to 650° F.−. Upon distillation, the fraction boiling below 650° F. (650° F.−) was predominately a paraffinic diesel, while the fraction boiling above 650° F. (650° F.+) was comprised primarily of oligomerized (primarily dimerized) species (gas chromatography/mass spectral analysis yielding a mass distribution centered around a C$_{36}$ paraffin (alkane). This 650° F.+ fraction had a viscosity at 100° C. of 3.8 centistokes (cSt), a pour point of +18° C., and a viscosity index (VI) of 151. This oil was further isomerized over Pt on SM-3 at 600° F. to give a 3.3 cSt oil of −10° C. pour point, −4° C. cloud point, and 204 VI.

9. Conclusion

The foregoing describes methods and systems for processing triglyceride-containing, biologically-derived oils to efficiently yield a combination of transportation fuels and base oils. Such methods and systems are based on an at least partial oligomerization of the carboxylic acid components contained within the triglyceride-containing, biologically-derived oil. Such methods and systems are economically advantageous as they provide for multiple product streams.

All patents and publications referenced herein are hereby incorporated by reference to the extent not inconsistent herewith. It will be understood that certain of the above-described structures, functions, and operations of the above-described embodiments are not necessary to practice the present invention and are included in the description simply for completeness of an exemplary embodiment or embodiments. In addition, it will be understood that specific structures, functions, and operations set forth in the above-described referenced patents and publications can be practiced in conjunction with the present invention, but they are not essential to its practice. It is therefore to be understood that the invention may be practiced otherwise than as specifically described without actually departing from the spirit and scope of the present invention as defined by the appended claims.

What is claimed is:

1. A method for producing base oil and diesel fuel, the method comprising the steps of:
   a) providing for a triglyceride-containing vegetable oil comprising both saturated and unsaturated fatty acid components;
   b) processing the triglyceride-containing vegetable oil to effect deoxygenation of saturated fatty acid components and oligomerization and deoxygenation of unsaturated fatty acid components contained therein so as to provide for an oligomerized mixture comprising an oligomer component, wherein said processing comprises hydrotreating and subsequent water removal;
   c) isomerizing the oligomerized mixture over an isomerization catalyst to yield an isomerized mixture; wherein the isomerized mixture comprises (i) a base oil component derived from oligomerization and deoxygenation of the unsaturated fatty acid components, and (ii) a diesel fuel component derived from the deoxygenation of the saturated fatty acid components; and wherein the isomerized mixture comprises at least 10 wt. % oligomers as alkanes having a carbon number of 30 or greater and contributing to the base oil component of the isomerized mixture; and
   d) distilling the isomerized mixture to yield a base oil and a diesel fuel.

2. The method of claim 1, further comprising a step of hydrofinishing the base oil.

3. The method of claim 1, wherein the step of processing further comprises an initial substep of hydrolyzing the triglycerides contained within the vegetable oil so as to yield free fatty acids.

4. The method of claim 1, wherein the vegetable oil comprises one or more biologically-derived oils selected from the group consisting of canola, soy, rapeseed, palm, peanut, jatropha, yellow grease, algae, and combinations thereof.

5. The method of claim 1, wherein the oligomer component of the oligomerized mixture comprises at least 50 wt. % dimer species.

6. The method of claim 1, wherein the oligomer component of the oligomerized mixture comprises at least 70 wt. % dimer species.

7. The method of claim 1, wherein oligomerization occurs temporally in a manner selected from the group consisting of before hydrotreating, during hydrotreating, and before and during hydrotreating.

8. The method of claim 1, wherein oligomeric yield is enhanced by increasing concentration of unsaturated fatty acid components via fractional crystallization techniques.

9. The method of claim 1, wherein the hydrotreating utilizes a catalyst comprising nickel-molybdenum on a support selected from alumina or SiO$_2$—Al$_2$O$_3$.

10. The method of claim 1, wherein the hydrotreating is carried out at a temperature between 550° F. and 800° F.

11. The method of claim 1, wherein the hydrotreating is carried out under a H$_2$ partial pressure of between 400 psig and 2000 psig.

12. The method of claim 1, wherein the hydrotreating is carried out under a H$_2$ partial pressure of between 500 psig and 1500 psig.

13. The method of claim 1, wherein a stripper is used to remove the water.

14. The method of claim 1, wherein the isomerization catalyst is a noble metal on a SAPO 11 support.

15. The method of claim 1, wherein the step of isomerizing is carried out at a temperature of between 550° F. and 750° F.

16. The method of claim 1, wherein the isomerized mixture comprises at least 20 wt. % oligomers as alkanes having a carbon number of 30 or greater.

17. The method of claim 1, wherein the isomerized mixture comprises at least 30 wt. % oligomers as alkanes having a carbon number of 30 or greater.

18. The method of claim 1, wherein the diesel fuel comprises at least 70 wt. % $C_{12}$ to $C_{18}$ alkanes.

19. The method of claim 1, wherein the diesel fuel has a pour point of less than −10° C.

20. The method of claim 1, wherein the base oil has a pour point of less than −10° C.

21. The method of claim 1, wherein the base oil has a viscosity index of greater than 120.

22. The method of claim 1, wherein the base oil has a viscosity index of greater than 130.

* * * * *